(12) United States Patent
Carvalho et al.

(10) Patent No.: US 11,704,488 B2
(45) Date of Patent: *Jul. 18, 2023

(54) MACHINE LEARNED LANGUAGE MODELING AND IDENTIFICATION

(71) Applicant: Snap Inc., Santa Monica, CA (US)

(72) Inventors: Vitor Rocha de Carvalho, San Diego, CA (US); Luis Carlos Dos Santos Marujo, Culver City, CA (US); Leonardo Ribas Machado das Neves, Marina Del Rey, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/544,664

(22) Filed: Dec. 7, 2021

(65) Prior Publication Data

US 2022/0092261 A1   Mar. 24, 2022

Related U.S. Application Data

(63) Continuation of application No. 15/953,357, filed on Apr. 13, 2018, now Pat. No. 11,210,467.

(60) Provisional application No. 62/485,357, filed on Apr. 13, 2017.

(51) Int. Cl.
*G06F 40/263* (2020.01)
*G06F 40/284* (2020.01)
*G06F 40/295* (2020.01)
*G06N 20/00* (2019.01)

(52) U.S. Cl.
CPC .......... *G06F 40/263* (2020.01); *G06F 40/284* (2020.01); *G06F 40/295* (2020.01); *G06N 20/00* (2019.01)

(58) Field of Classification Search
CPC .... G06F 40/263; G06F 40/284; G06F 40/295; G06N 20/00
See application file for complete search history.

(56) References Cited

U.S. PATENT DOCUMENTS

| | | |
|---|---|---|
| 2015/0113018 A1 | 4/2015 | Steed et al. |
| 2016/0283462 A1 | 9/2016 | Gallé et al. |
| 2018/0053116 A1 | 2/2018 | Cai et al. |
| 2018/0189259 A1 | 7/2018 | Merl et al. |

OTHER PUBLICATIONS

"U.S. Appl. No. 15/953,357, Final Office Action dated May 28, 2020", 11 pgs.
"U.S. Appl. No. 15/953,357, Non Final Office Action dated Jan. 14, 2021", 12 pgs.

(Continued)

*Primary Examiner* — Sonia L Gay
(74) *Attorney, Agent, or Firm* — Schwegman Lundberg & Woessner, P.A.

(57) ABSTRACT

Systems, devices, media, and methods are presented for generating a language detection model of a language analysis system. The systems and methods access a set of messages including text elements and convert the set of messages into a set of training messages. The set of training messages are configured for training a language detection model. The systems and methods train a classifier based on the set of training messages. The classifier has a set of features representing word frequency, character frequency, and a character ratio. The systems and methods generate a language detection model based on the classifier and the set of features.

20 Claims, 10 Drawing Sheets

(56) References Cited

OTHER PUBLICATIONS

"U.S. Appl. No. 15/953,357, Non Final Office Action dated Nov. 18, 2019", 10 pgs.
"U.S. Appl. No. 15/953,357, Notice of Allowance dated Aug. 24, 2021", 7 pgs.
"U.S. Appl. No. 15/953,357, Response filed Feb. 18, 2020 to Non Final Office Action dated Nov. 18, 2019", 10 pgs.
"U.S. Appl. No. 15/953,357, Response filed Jul. 14, 2021 to Non Final Office Action dated Jan. 14, 2021", 10 pages.
"U.S. Appl. No. 15/953,357, Response filed Nov. 30, 2020 to Final Office Action dated May 28, 2020".
Bergsma, Shane, et al., "Language Identification for Creating Language-Specific Twitter Collections", Proceedings of the 2012 Workshop on Language in Social Media (LSM 2012), (Jun. 7, 2012), 65-74.
Castro, Dayvid, et al., "Discriminating between Brazilian and European Portuguese national varieties on Twitter texts", 6 pgs.
Gebre, Binyam Gebrekidan, et al., "Improving Native Language Identification with TF-IDF Weighting", Proceedings of the Eighth Workshop on Innovative Use of NLP for Building Educational Applications, (Jun. 13, 2013), 216-223.
Voort, Gijs Van Der, "Semi-supervises review tweet classification", 23 pgs.
U.S. Appl. No. 15/953,357, filed Apr. 13, 2018, Machine Learned Language Modeling and Identification.

MACHINE LEARNED LANGUAGE MODELING AND IDENTIFICATION

RELATED APPLICATIONS

This application is a continuation of U.S. patent application Ser. No. 15/953,357, filed on Apr. 13, 2018, which claims the benefit of priority to U.S. Provisional Application Ser. No. 62/485,357, filed on Apr. 13, 2017, each of which are hereby incorporated herein by reference in their entireties.

TECHNICAL FIELD

Embodiments of the present disclosure relate generally to generating machine learned models. More particularly, but not by way of limitation, the present disclosure addresses systems and methods for identifying languages represented by character limited sets of text.

BACKGROUND

Telecommunications applications and devices can provide communication between multiple users using a variety of media, such as text, images, sound recordings, and/or video recording. For example, applications and devices may allow users to select keyboard input or language settings corresponding to a language spoken by the user.

BRIEF DESCRIPTION OF THE DRAWINGS

Various ones of the appended drawings merely illustrate example embodiments of the present disclosure and should not be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Applications may analyze information to identify a language associated with text. For example, applications may identify language preferences of a user or a device to identify language of a text. Where text is analyzed to identify a language, previous systems rely on large portions of text and lack accuracy when presented with text that is short, character limited, or word limited (e.g., such as five words or less). Further, these previous systems lacked accuracy where text incorporated idioms, abbreviations, colloquialisms, vernacular, misspellings, grammatical mistakes, unexpected or informal language or punctuation use, and other abnormalities in character or word usage. Further, previous systems lack accuracy where non-textual characters are incorporated, such as ideograms, ideographs, pictographs, emojis, and other special characters. For example, accuracy of previous systems may be directly limited by word or token count in a portion of text.

Figure 6:
FIG. 6 is a user interface diagram depicting an example text interpreted by a language detection model, according to some example embodiments.
Figure 7:
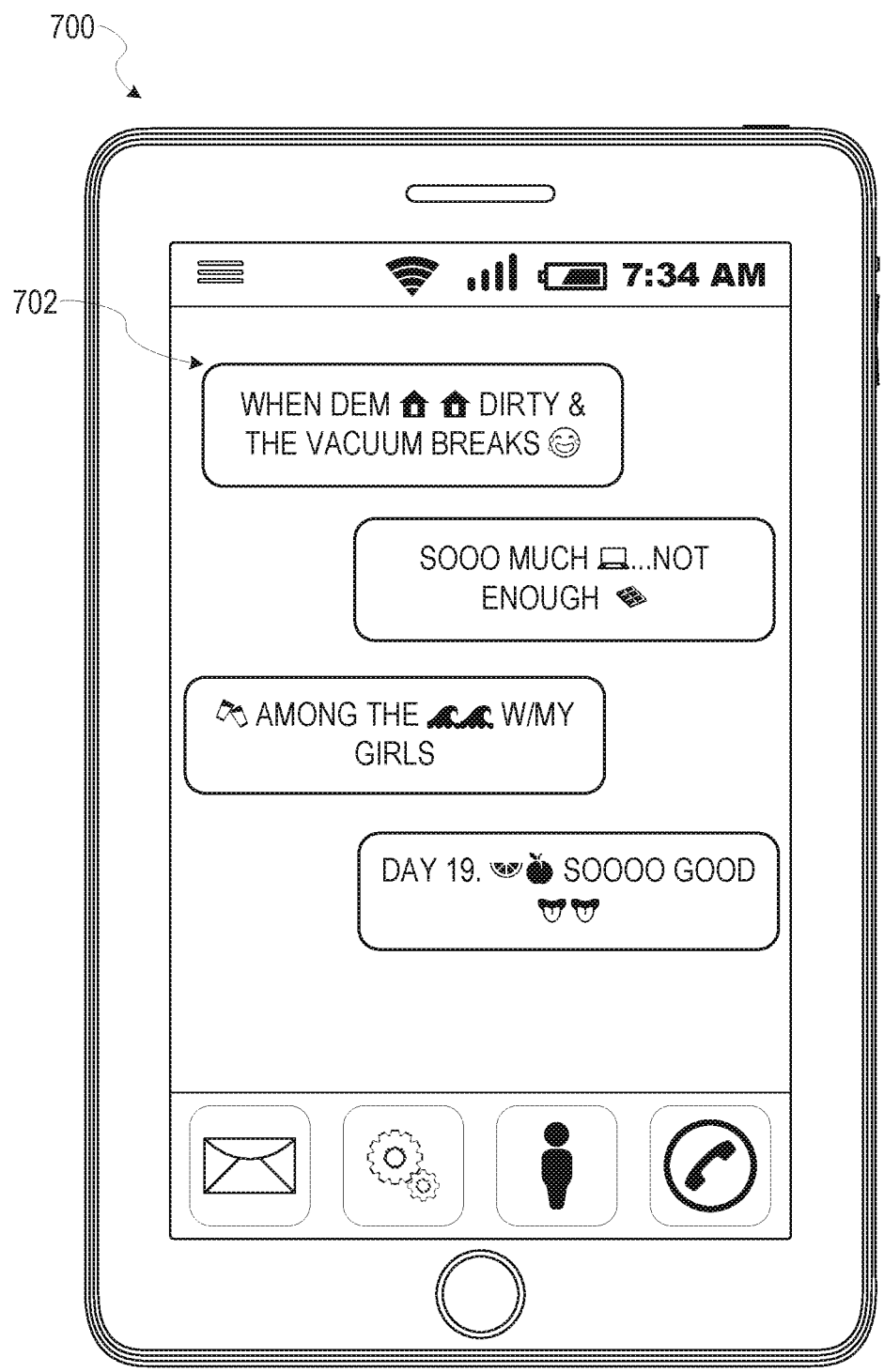
FIG. 7 is a user interface diagram depicting an example text interpreted by a language detection model, according to some example embodiments.

Systems and methods of the present disclosure enable accurate identification of language for sets of text. Accuracy is maintained regardless of character or word length for sets of text. Further accuracy is maintained despite informalities included in language, punctuation, characters, ideograms, and pictographs. For example, languages used in messages or captions, which include graphical elements, as shown in FIG. 6, may be accurately identified by the methods and systems described herein. Further, as shown in FIG. 7, the methods and systems of the present disclosure may correctly identify languages for messages or captions including slang, graphical elements, abbreviations, and the like. For example, embodiments described herein may provide increased accuracy levels, despite a number of words or tokens in a set of text. Language models of the present disclosure may incorporate more or substantially more features and additional models and modeling stages than incorporated in previous systems.

Systems and methods of the present disclosure enable automatic identification of languages used in text. Such systems and methods remain accurate for shorter text, such as tweets and social media posts. The systems and methods may produce accurate results even with messages incorporating frequent use of slang, typos, nicknames, abbreviations, phonetic mappings, and other informalities.

The above is one specific example. The various embodiments of the present disclosure relate to devices and instructions by one or more processors of a device to identify one or more languages for text, regardless of length or informalities. A language analysis system is described that identifies one or more languages used to composed text identified, provided to, or received by the system, even where the text is short or contains informalities.

Figure 1:
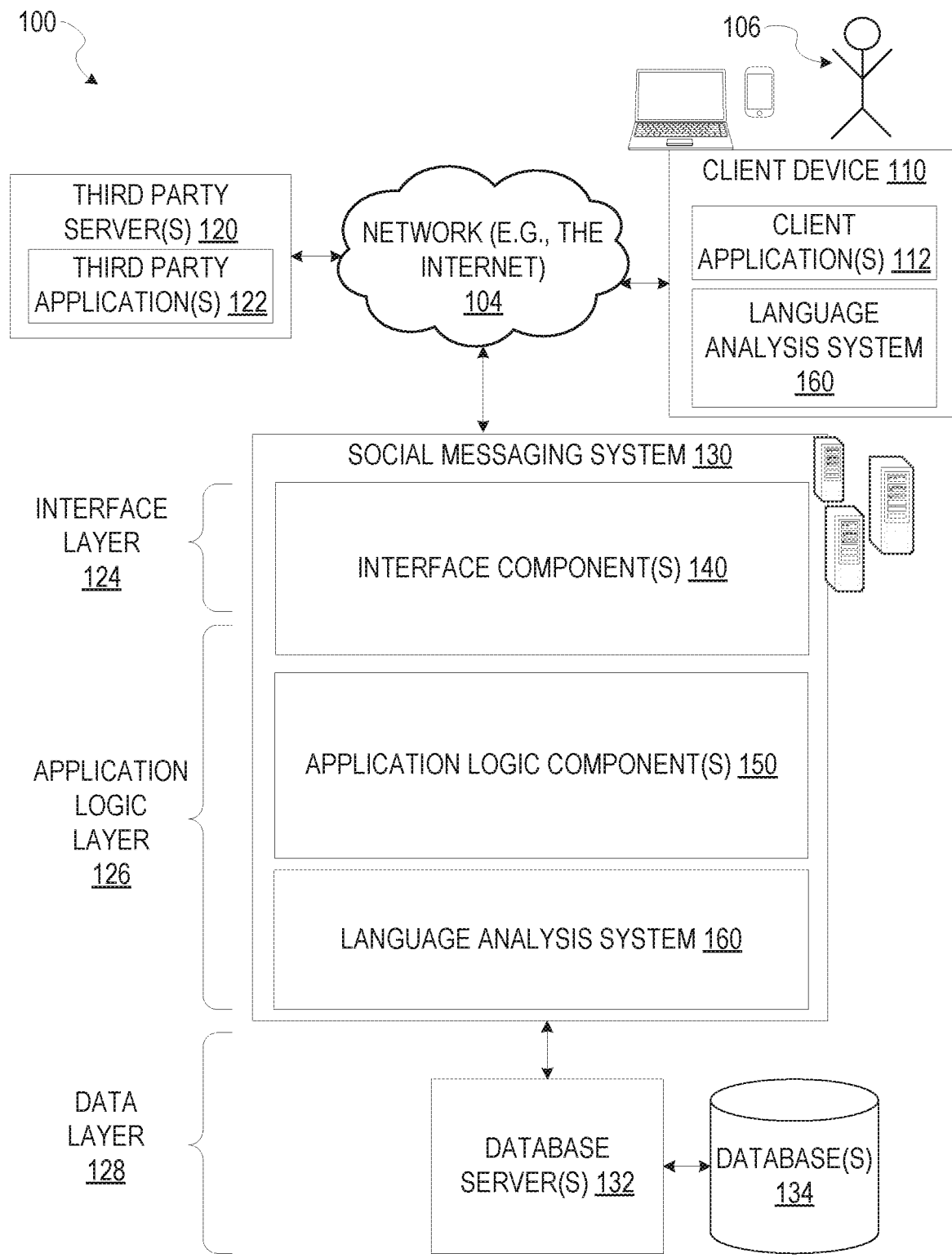
FIG. 1 is a block diagram illustrating a networked system, according to some example embodiments.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a language analysis system 160 such that components of the language analysis system 160 configure the client device 110 to perform a specific set of functions with respect to operations of the language analysis system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the language analysis system 160 to identify one or more languages corresponding to a set of text of a limited size, character count, or word count.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the language analysis system 160 capable of identifying one or more languages within a set of text. Similarly, the client device 110 includes at least a portion of the language analysis system 160, as described above. In other examples, client device 110 may include the entirety of the language analysis system 160. In instances where the client device 110 includes a portion of (or all of) the language analysis system 160, the client device 110 can work alone or in cooperation with the social messaging system 130 to provide the functionality of the language analysis system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the language analysis system 160 may identify one or more languages within a set of text. The device may identify languages as a part of a generation of content for an ephemeral message.

Figure 2:
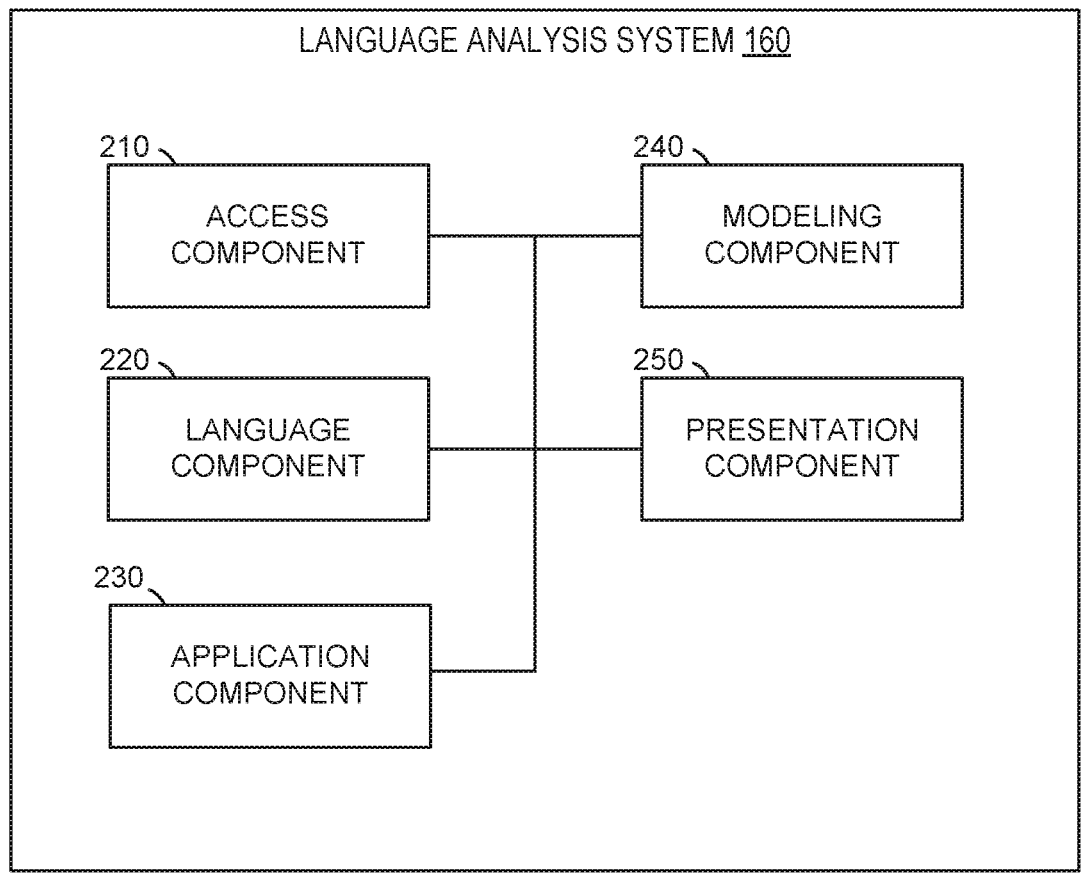
FIG. 2 is a diagram illustrating a language analysis system, according to some example embodiments.

In FIG. 2, in various embodiments, the language analysis system 160 can be implemented as a standalone system or implemented in conjunction with the client device 110, and is not necessarily included in the social messaging system 130. The language analysis system 160 is shown to include an access component 210, a language component 220, an application component 230, a modeling component 240, and a presentation component 250. All, or some, of the components 210-250, communicate with each other, for example, via a network coupling, shared memory, and the like. Each component of components 210-250 can be implemented as a single component, combined into other components, or further subdivided into multiple components. Other components not pertinent to example embodiments can also be included, but are not shown.

Figure 3:
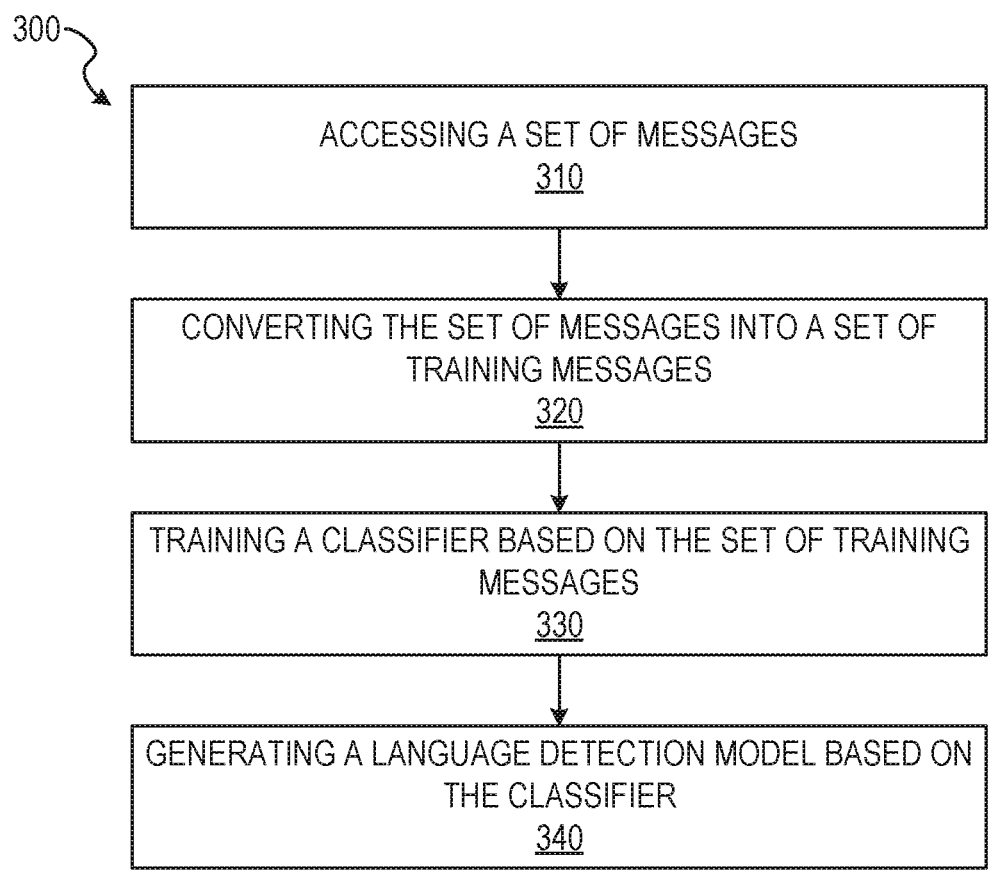
FIG. 3 is a flow diagram illustrating an example method for generating a language detection model, according to some example embodiments.

FIG. 3 depicts a flow diagram illustrating an example method 300 for generating a language detection model. The operations of method 300 may be performed by components of the language analysis system 160, and are so described below for purposes of illustration.

In operation 310, the access component 210 accesses a set of messages including text elements. The access component 210 may access the set of messages within a database of messages, such as a testing database. In some embodiments, the testing database is populated with messages selected for testing, provided to the testing database by one or more users of a messaging system, or any other suitable manner.

In some embodiments, the set of messages are text-based messages, messages with text elements, or text representations conveying a concept, thought, emotion, or any other suitable communication. The text representations or text elements may fully comprise the set of messages or may be appended to, overlaying, or otherwise associated with images, videos, audio, or any other suitable media. For example, the text representations or text elements may be a caption within or appended to a message. The set of messages may comprise text messages, short message service (SMS) messages, social media messages or posts, or any other suitable message.

The text, text elements, or text representations of the set of messages may comprise one or more of text characters, numeral characters, spacing characters, punctuation characters, American Standard Code for Information Interchange (ASCII) characters, ideograms, ideographs (e.g., emojis), logograms, words, unicode representations (e.g., characters represented by the Universal Coded Character Set), combinations thereof, or any other suitable information representing communication in one or more languages. For example, as shown in FIGS. 6 and 7, a set of messages 602 or 702, presented on a client device 600 or 700, may include text and graphical elements (e.g., ideographs or emojis). In some embodiments, the text of a message is received by the access component 210 as a set of unicode values encoding or representing one or more text characters, numeral characters, punctuation characters, mathematical symbols, ideograms, ideographs, or any other suitable information. Although described as a set of unicode values, it should be understood that the text may be received as a set of encoded values representing individual characters or groups of characters, with the set of encoded values representing the characters, words, or concepts of the text representation in any suitable encoding scheme.

In some instances, encoding of text may be used to generate the text, text elements, or text representation. For example, text characters for a message received by the access component 210 may be encoded using unicode to generate the text representation. In some instances, encoding schemes, such as unicode, use a table of values. The tables associate a specified character, punctuation, symbol, ideogram, ideograph, or pictograph with an encoded value. The tables may be ordered or clustered such that a set of encoded values representing characters used in a specified language are set within a defined range of table positions. Such table position ranges may be blocks. For example, a unicode block may include encoding values for characters common to, unique to, or used in a certain language (e.g., Arabic, English, or Spanish).

In some embodiments, a test dataset (e.g., the set of messages) is collected and a portion of the test dataset may be used as training data in the form of the set of messages. In such cases, the set of messages may be a subset of the test dataset. The test dataset may include a labeled binary dataset. The test dataset may comprise documents (e.g., messages, captions, publications, or text sets) incorporating characters or words of one or more known languages. For example, an initial test dataset may include thousands (e.g., seven thousand) manually labeled binary datasets. The labels for the datasets may be of any suitable and identifiable language, such as English, Spanish, Portuguese, Japanese, or Arabic. In some instances, the test dataset is a multilingual dataset, including differing languages in two or more languages among the dataset or documents within the dataset. In some embodiments, labeling of the test dataset may incorporate contextual aspects. Contextual aspects may comprise temporal elements (e.g., a time of creation), location elements (e.g., a place at which the document was created, a region associated with the document, a place or region associated with a user creating the document, or a place or region associated with a client device creating or receiving the document), or any other suitable contextual aspect. For example, a document comprising an image caption generated in Paris, France or associated with an image depicting Paris, France may have a Paris, a France, or a Paris, France locale label for the document.

In some instances, a test dataset is used, including any suitable number of messages or documents. For example, in some instances, thousands of documents (e.g., seven thousand) are included in a set of training messages or test dataset. In some embodiments, a test dataset may include greater or fewer examples, such as around three hundred thousand captions retrieved from around one thousand document sets or collections. The documents may be manually labeled for a language attributable to text within the documents. In some instances, test datasets may be limited to languages having a noise level below a specified threshold. A specified number of languages, type of languages, or ratio of languages may be used within test datasets. For example, in some test datasets documents are included comprising five languages (e.g., English, French, Portuguese, Spanish, and Arabic) and having a specified balance or ratio. For example, a balance between the five languages may include around 50,000 English documents and 30,000 documents of each of the other four languages. In some instances, languages, included in the test dataset, other than the five specified languages may be labeled as a group.

In operation 320, the language component 220 converts the set of messages, or at least a portion of a test dataset, into a set of training messages. The set of training messages are configured and selected for training a language detection model. The language component 220 may convert the set of messages into the set of training messages by encoding text retrieved from the set of messages into a specified format, encoding (e.g., unicode), set of values, or any other interpretable scheme. In some embodiments, the language component 220 performs one or more preprocessing operations to convert the set of messages prior to generating a classifier or a language detection model.

As described in more detail below, in FIG. 4, the language component 220 may convert the set of messages into the set of training messages by identifying and removing unsuitable messages, unsuitable portions of messages, repetitive elements, or other messages or aspects thereof. For example, messages containing two text-based characters or fewer, messages containing only text representing named entities (e.g., user names, proper nouns, etc.), or other messages unsuitable for identifying a language used to generate the message (e.g., messages containing only URL links, numbers, etc.).

In some instances, the language component 220 converts the messages by removing, ignoring, or disregarding, certain portions of text within a message. For example, the language component 220 may remove URLs, line breaks, emojis, digital stickers, graphics, trailing spaces, hashtags, non-text symbols, or other characters or media which may not represent or include representations of a spoken or written language. Where a message contains only the former, the message may be removed from the set of messages. Where a message contains a suitable amount of text (e.g., a number of characters above a specified threshold), the language component 220 may remove or disregard the above-referenced formatting or characters, while maintaining the remaining text for the set of training messages. The language component 220 may also normalize repeated characters to remove redundancies or superfluous characters within the text of the messages.

In operation 330, the language component 220 trains a classifier based on the set of training messages. In some embodiments, the classifier has a set of features. The features may represent word frequency, character frequency, a character ratio, and other suitable features representing one or more elements of or associated with text representations of linguistic elements of a language in which a message has been composed. In some embodiments, features used in the models or classifiers described herein may be overlapping features, such as overlapping word and character-based n-gram representations. In some instances, features or combinations of features may correspond to layers, connected layers, or fully connected layers of a machine learning algorithm.

In some embodiments, the classifier generated for inclusion in the one or more language models comprises or is associated with a Bayesian model, a Naive Bayes model (e.g., a Naive Bayes classifier), a Gaussian Naive Bayes model, a Multinomial Naive Bayes model, a Bernoulli Naive Bayes model, a Random Forest classifier, a Gradient Boosting Machine classifier, a Support Vector Machine classifier, combinations thereof, or any other inference model, identification model, prediction model, or other suitable model or model type. In some instances, models may be generated as two-stage models, with a first stage including preprocessing operations and a second stage using a model, as described below in more detail. The classifier may be generated as part of one or more of the two-stage model.

In some embodiments, features used in the classifier or language detection model comprise character n-grams, character n-grams using an inverse document frequency (IDF), character n-grams using term frequency-inverse document frequency (TF-IDF), word representation, word IDF representation, word TF-IDF representation, locale representation, unicode representation, unicode ratio representation, combinations thereof, subsets thereof, and any other suitable features. In some instances, character n-grams, character n-gram IDF, or character n-gram TF-IDF comprises any suitable number of characters for the n-gram. Some embodiments of n-grams comprise one-character n-grams, two-character n-grams, three-character n-grams, four-character n-grams, five-character n-grams, or any suitable number of characters. Each n-gram value may be associated with a distinct feature or may be combined with other features for a similar n-gram type (e.g., a character n-gram feature). In some instances, the n-grams incorporate characters comprising portions of words, abbreviations, terms, or phrases. The n-grams may also incorporate characters acting as spacing between characters, words, phrases, sentences, punctuation, or the like. N-grams may also incorporate non-letter characters such as numeral characters, pictographs, ideograms, ideographs, punctuation, and other characters attributable to one or more languages or encoding schemes (e.g., unicode). Where n-grams incorporate spaces or spacing characters, the character n-gram features may consider, represent, or evaluate interactions between words in a text representation.

IDF may refer to a numerical statistic reflecting how meaningful a specified n-gram or word is for a given in a document, a set of documents, a collection of documents, or document type compared to other document, sets of documents, a collection of documents, or document types. The relevance may be determined by an inverse frequency of character occurrences in the documents. Documents may be understood as documents, messages, publications, or other accessible information. In some instances, documents included for use in features associated with n-grams and words may be a subset of available documents having character, word, or size aspects corresponding to or comparable to the text representation. For example, where the text representations include characters below a predetermined limit, documents used as part of the IDF document corpus may have a character limit corresponding (e.g., matching, comparable to, or "at or below") the predetermined limit for the text representation. In some embodiments, language unique n-grams or words (e.g., n-grams or words occurring only in one language or a subset of languages) are weighted within a model generated by the modeling component 240. In some embodiments, word IDF or word TF-IDF features may be similar to n-gram IDF or n-gram TF-IDF features applying to words. Word IDF or word TF-IDF features may aid in text representations (e.g., messages and captions) having of lengths below a length threshold or having known words.

In some instances, an n-gram feature may evaluate varying sequences of characters within the text of the text representation. N-gram values may be smoothed using one or more smoothing operations, such as Laplace smoothing. In some embodiments, the language detection model or classifier comprises a set of n-gram features. For example, a single language detection model or classifier may incorporate distinct n-gram features for n-grams having a value of 1, 2, 3, 4, and 5 grams. Although described with respect to specified n-gram values, it should be understood that the language detection model or classifier may incorporate a fewer or greater number of n-gram features (e.g., all n-grams between 1 and 6, all n-grams between 1 and 3, or any other suitable number or variation of numbers of grams). The n-gram features may break words, sequences of words, phrases, sequences of phrases, sentences, or any other grouping of text characters into varying numbers of characters for evaluation by a language detection model or classifier.

The word frequency feature may represent word frequencies for a plurality of word n-grams. A word feature evaluates individual words or sequences of words. The word feature or word features may identify words or sequences of words for evaluation by a language detection model. The word frequency feature may additionally determine identify a frequency of use or a frequency value associated with the individual words. In some embodiments, the word frequency feature is a TF-IDF value of n-grams of words. The n-grams represented by the TF-IDF values may be word n-grams having varying lengths of characters. The character frequency feature may represent character frequencies for a plurality of character n-grams. In some embodiments, the character frequency is a TF-IDF value of n-grams of characters. The n-grams represented by the TF-IDF values may be character n-grams having a varied number of characters.

The character ratio feature may represent a number of characters, excluded from a known character set, relative to a length of a message. For example, where the text is encoded in unicode, as described above, the character ratio may be a unicode ratio. The unicode ratio may be understood as a measure of a number of non-ascii characters divided by the length of the message (e.g., the total number of characters in the message).

In some embodiments, the set of features includes a location or locale feature. The location feature may represent a message location. The message location may be a geographical location at which the messages was composed or initially transmitted at a client device or at which the message was received at a client device.

A locale feature may incorporate information relating to a location of a client device 110 or a user in determining a language of the text representation. One or more locale features included in a language detection model may identify, infer, determine, or estimate a location for evaluation by the language detection model. The locale feature may determine a location or evidence indicating a location from one or more of the characters in the text, metadata associated with the text representation, information included in the text representation, a device context, a user context, or any other suitable source. The locale feature may be subject to privacy protections, privacy settings, anonymization, or any other suitable methods to protect privacy and information of a user. A unicode feature or unicode ratio feature may incorporate aspects relating to unicode translations or encoding of characters within the text representation. In some embodiments, a unicode ratio feature is a non-ascii character count divided by a number of characters in a set of text (e.g., a message, a caption, or a text representation).

In some embodiments, an encoding feature (e.g., a unicode representation feature) identifies elements, aspects, or characteristics associated with or determinable by an encoding scheme used to generate the text, text element, or text representation. For example, the encoding feature may identify an encoding scheme, such as unicode. The encoding feature may also identify values (e.g., unicode values) associated with blocks, table position ranges, clusters, or other groupings corresponding to encoded values associated with specified languages.

In some embodiments, the encoding feature is dynamically weighted. Dynamic weighting of the encoding feature may correspond to a number of characters within an encoding block for a language, a ratio of characters of an encoding block to other characters, or any other suitable aspect of the encoding. For example, a single character corresponding to a value in an encoding block may be given a weight comparatively lower than a high ratio of characters or a ratio of characters exceeding a ratio threshold corresponding to a single encoding block. By way of further example, the ratio may be determined as a number of characters associated with an encoding block for a single language divided by a total number of characters. In some instances, the encoding feature may be associated with or used in conjunction with one or more n-gram features. In some embodiments, the encoding feature is dynamically included in a language detection model based on a confidence value determined after processing one or more n-gram features.

In operation 340, the modeling component 240 generates a language detection model based on the classifier and the set of features. The language detection model may comprise the classifier and processor executable coding suitable to execute the classifier against text, messages, or documents received in a messaging application presented on a client device. In some embodiments, the language detection model comprises the classifier, the features of the classifier, an estimator, combinations thereof, and any other suitable mechanism, functionality, or algorithms suitable for language detection.

In some embodiments, a Naive Bayes classifier is used as a model or a portion of a language detection model. A language of a test message d may be described by a feature vector $x=(x_1, \ldots, x_n)$. In some instances, "$x_1$" counts a number of times an event "i" is observed. A likelihood of observing a feature vector "x" may be represented by Equation 1, below.

$$p(x \mid C_k) = \frac{(\sum_i x_i)}{\prod_i x_i!} \prod_i p_{ki}^{x_i} \qquad \text{Equation 1}$$

The feature vector likelihood may be predicted by Equation 2, below.

$$\hat{l}(d) = \underset{C_k \in L}{\mathrm{argmax}} P(C_k) = \log(P(C_k) + \sum_{i=1}^{n} x_i \log(p_{ki})) \qquad \text{Equation 2}$$

In Equation 2, "C" may be a set of languages in a training set, "$p_{ki}$" is a probability of event "i" occurring for a language "k." In some embodiments, the feature vector "x" for n-gram features may be performed using one or more operations. In some instances, a plurality of window are generated for characters and words within a specified dimension. For each window, TF-IDF values may be calculated using Equation 3, below.

$$TF - IDF(t, D) = tf(t, d) \times \log \frac{|D|}{1 + |\{d \in D : t \in d\}|} \qquad \text{Equation 3}$$

In Equation 3, tf(t,d) is a number of occurrences of pattern "t" in a text set "d." "|D|" may be a number of messages in a dataset, and |{d∈D:t∈d}| is a number of messages containing a pattern "t." TF-IDF may be used as frequency or count of an n-gram model. For example, the n-gram model may predict a pattern "$z_i$" based on previous patterns "$z_{i-(n-1)}, \ldots, z_{i-1}$." Such prediction may be represented by Equation 4, below.

$$P(z_i \mid z_{i-(n-1)}, \ldots, z_{i-1}). \qquad \text{Equation 4}$$

The set of features may quantify an effect of the elements in identifying one or more languages comprising one or more of words, symbols, and characters within the text and indicated by the text representation. In some embodiments, a language model generated by the modeling component 240 may incorporate hundreds or thousands of features. For example, a language detection model may incorporate 23,000 features per language. Language detection models may also be compressed to incorporate a smaller number of features per language, such as five hundred features per language. In some embodiments, the elements comprise one or more of text characters, numeral characters, ideograms, pictographs, words, phrases, slang terms, abbreviations, colloquialisms, expressions, misspellings, locations locales, language preference settings, device characteristics or settings, combinations thereof, or any other suitable elements.

In some embodiments, a language detection model, generated in operation 340, may parse the text representation using patterns gleaned from test datasets, sets of messages, or training messages, via one or more machine learning processes or operations. In some instances, the language detection models of the language component 220 and the modeling component 240 better identify or determine one or more language of a text representation. The language detection models also provide a higher accuracy for language detection in sets of text having limited character or word counts.

Once trained, the language detection models of the modeling component 240 are available to the language component 220. In some embodiments, upon receiving the text representation from the access component 210, the language component 220 performs one or more operations to identify the one or more languages for text underlying the text representation. In some instances, the one or more operations comprise configuration processes. The configuration processes may be preprocessing operations configuring the text representation and underlying text for use in the one or more language models.

Figure 4:
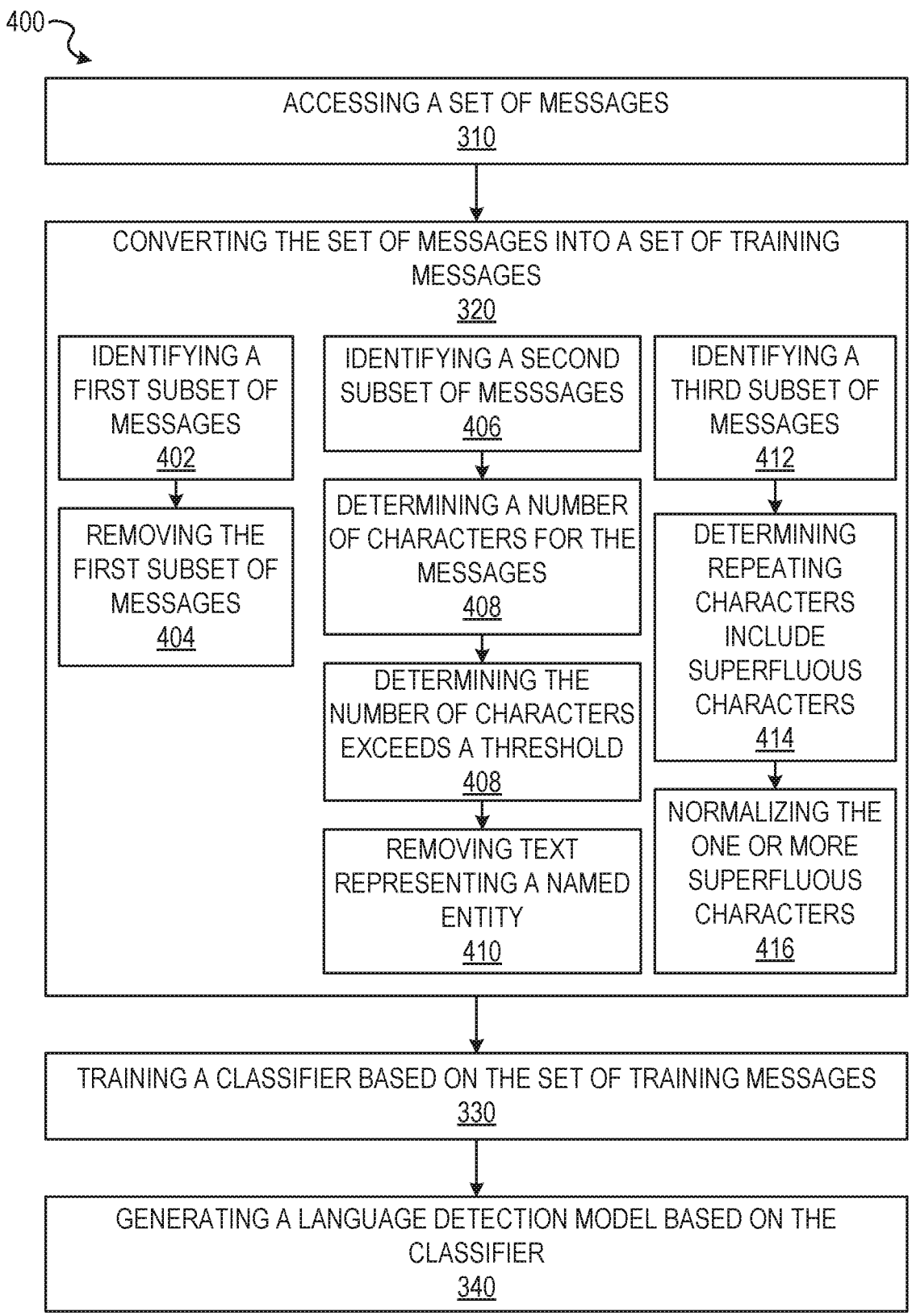
FIG. 4 is a flow diagram illustrating an example method for generating a language detection model, according to some example embodiments.

FIG. 4 depicts a flow diagram illustrating an example method 400 for generating a language detection model. The operations of method 400 may be performed by components of the language analysis system 160, and are so described for purposes of illustration. In some embodiments, as shown below, one or more of the operations of method 400 are performed as part of, during, or after one or more operations of method 300. For example, operations of method 400 may be performed as part of operation 320. In some instances, one or more of the operations of method 400 are performed as preprocessing operations or configuration processes to modify a set of messages or test dataset into suitable training messages for generating and training one or more of a classifier and a language detection model.

In operation 402, the language component 220 identifies a first subset of messages. The first subset of messages may be included within the set of messages and may have a number of characters below a character threshold. The character threshold may be a predetermined threshold, such as two characters, three characters, five characters, or any other suitable number of characters below which the number of characters is unsuitable to identify a language used to compose the message. The character threshold may be predetermined for each language or predetermined for all of the languages identifiable by a language detection model. In some embodiments, the character threshold may be variable, based on a language to be identified, identifying aspects of the characters, or other suitable characteristics of the message. For example, the character threshold may be reduced where some or all of the characters are pictographs or other representations of a language, such that the representations may convey information about an underlying language in a single or limited number of characters.

In operation 404, the language component 220 removes the first subset of messages from the set of messages. Once identified as containing a number of characters below the character threshold, the language component 220 may preclude the first subset of messages from consideration among the set of training messages. Removal of the first subset of messages may comprise deletion of the first subset, regrouping or recategorizing messages remaining in the set of messages, or ignoring the first subset of messages.

In operation 406, the language component 220 identifies a second subset of messages containing text representing a named entity. The language component 220 may process the text contained within the set of messages to identify named entities in the second subset of messages by identifying proper nouns, such as a name, a nickname, a username, or other similar designations. Where the text representing the named entity is associated with a specified language, the message may be considered for use in the set of training messages. After identifying messages which include text representing the named entity (e.g., a name unassociated or unidentifiable relative to a specified language), the language component 220 may then identify the messages which contain no other text but the text representing the named entity. Those messages containing no other text than the named entity may be removed from the second subset of messages. Messages having text or characters in addition to the text representing the named entity are included in the set of training messages or may be included in the set of training messages without the text representing the named entity.

Similarly, in some embodiments, the language component 220 may remove known or specified characters, such as ideographs, ideograms, or other non-text characters. In some instances, specified or known ideograms are associated with known encoding or representation values, but not a specified language. The language component 220 may compare the text representation with the known encoding values, removing the matching values from the text representation. Similarly, the language component 220 may remove known or specified designation characters. The designation characters may identify a portion of the text underlying the text representation. The portion of text may be designated as a name, a proper noun, or any other set of characters. For example, "@" and "#" may be specified as designation characters, such that the "@" character designates a portion of text as a user name or an address and the "#" character designates a portion of text as tag or formatted character group (e.g., a slogan with no spacing between words). In some embodiments, these removal operations also remove or otherwise ignore uniform resource locators (URLs), user names, names, and other portions of text which may be independent of language.

In operation 408, the language component 220 determines, for each message within the second subset of messages, a number of characters of the message is above a character threshold. The number of characters used for the determination may be characters in the message, excluding the text representing the named entity. As discussed above, the language component 220 may determine characters, included in each message and excluding the text of the named entity. Where the remaining characters are above the character threshold, the language component 220 may segment the message to separate characters associated with the named entity and remaining characters within the message.

In operation 410, the language component 220 removes the text representing the named entity from the second subset of messages. The language component 220 may remove the text by deleting the text from messages within the second subset of messages. The language component 220 may remove the text by replacing or overwriting the text with null, zero, or other values indicating excluded text. The language component 220 may also preclude consideration of the named entity text by changing metadata values associated with that text, indicating the text is removed from consideration by the language model. Once the named entity text is removed from the second subset of messages, the second subset of messages may be incorporated into the set of training messages.

In operation 412, the language component 220 identifies a third subset of messages. The third subset of messages may include text with repeating characters. The language component 220 may identify the third subset of messages based on repetition of characters within a specified proximity, such as characters in subsequent or immediately proximate spaces. For example, as shown in FIGS. 6 and 7, repeating and superfluous characters "E" and "O," respectively, may be included in a set of messages 602 or 702.

In operation 414, the language component 220 determines, for each message, that the repeating characters include one or more superfluous characters. In some embodiments, the language component 220 identifies repeated characters, within the text representation, which are unexpected. The language component 220 may identify repeated or superfluous characters based on a repeat threshold. The repeat threshold may be a number of characters which are repeated in certain words within a language, such as "cc" or "ss" in English or "ll" in Spanish, or repeated according to grammatical rules associated with a language, such as "a double space" after certain punctuation. Repetitive characters above the repeat threshold may be flagged or otherwise marked as superfluous.

In operation 416, the language component 220 normalizes, for each message, the one or more superfluous characters. The normalization operations may remove or ignore redundant or extra spaces between words, spaces between punctuations, variations in type of punctuation, variations in capitalization, and other identifiable variations. In some instances, the configuration processes may be understood to eliminate, reduce, format, or otherwise configure text underlying the text representation to characters, words, phrases, symbols, ideograms, and pictographs useful in identifying, detecting, or differentiating between languages.

In some embodiments, the language component 220 may perform one or more contraction operation to normalize the characters by compressing or otherwise reducing superfluous or redundant characters occurring within text of the text representation. The repeated characters may be contracted or reduced to a single instance of the character or an instance of the character within the repeat threshold. In some instances, the language component 220 removes the repeated characters from the text representation. The language component 220 may also remove a portion of the repeated characters, leaving more than the single instance. For example, where the text underlying the text representation includes a set of characters "Looooouuuuuve," the language component 220 may contract the set of characters to "Louve." Similarly, where a portion of the characters are non-letter characters, such as "Looo00000ve," the language component 220 may contract the set of characters to "Lo0ve" or "Love." Although described with respect to text characters or numeral characters, the language component 220 may contract the characters of the text representation which are ideograms, punctuation marks, or any other characters.

Once one or more configuration operations, outlined in FIG. 4, have been performed, the language component 220 may pass the text representation through the classifier or the one or more language detection models. The language detection models may identify elements, aspects, or characteristics of the text underlying the text representation or associated with the text representation and output a specified language of the text. In some instances, the language detection model may cooperate with a messaging application to change one or more settings. For example, the language detection model may cooperate with the messaging application to translate a message from a first language to a second language. The language detection model and the messaging application may cooperate to adjust other language settings of the messaging application or the client device to enable easier entry of user input in the identified language. The language detection model and the messaging application may also display the language associated with the message.

The elements, aspects, or characteristics may be identified by one or more features included in the one or more language detection models. In some embodiments, the language detection models incorporate one or more word features, such as TF-IDF values of n-grams of a word; one or more n-gram features, such as TF-IDF values of character n-grams (e.g., a feature for each distinct n-gram length); and a unicode ratio feature, measuring a ratio of non-ascii characters divided by a character number of the text representation.

Figure 5:
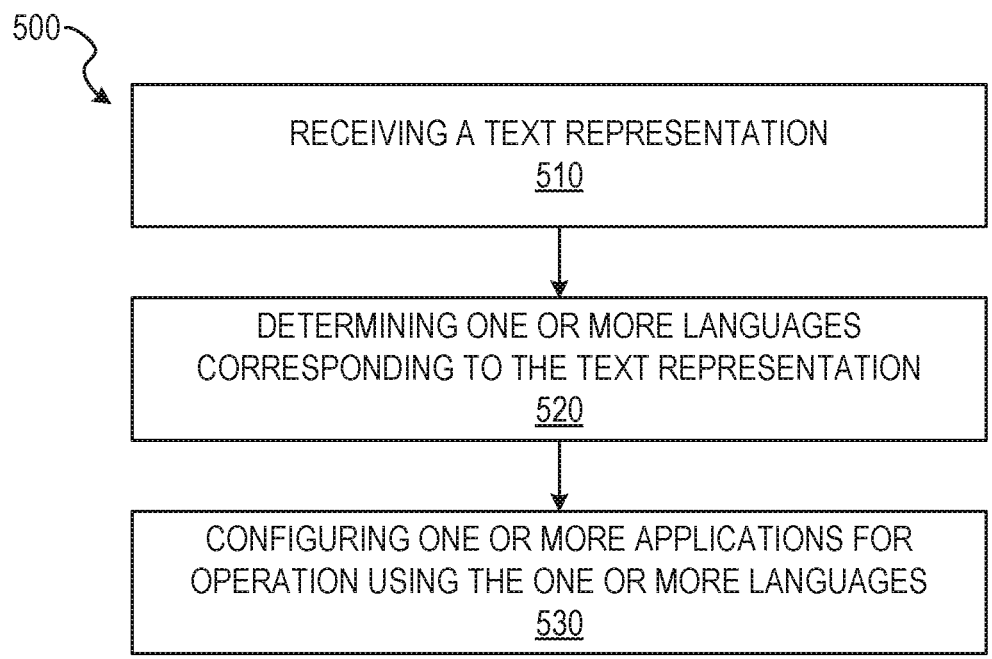
FIG. 5 is a flow diagram illustrating an example method for identifying languages within a set of text, according to some example embodiments.

FIG. 5 depicts a flow diagram illustrating an example method 500 for identifying one or more languages within a set of text. The operations of method 500 may be performed by components of the language analysis system 160, and are so described below for purposes of illustration.

In operation 510, the access component 210 receives or otherwise accesses a text representation. In some embodiments where the language analysis system 160 is stored on the client device 110, the access component 210 receives the text representation as a part of a message (e.g., a text message; an ephemeral message; a short message entered into an application; a caption incorporated into an image, a video, or a graphics interchange format file; or a caption appended to an image, video, or graphics interchange format file). The text representation may be received by the access component 210 as information transmitted to or received by the client device 110 from another client device or the social messaging system 130. The text representation may also be received by the access component 210 as information entered into the client device 110, such as by an input device coupled to or in communication with the client device 110.

In some instances where the language analysis system 160 is stored on the social messaging system 130, the access component 210 receives the text representation from one or more client devices (e.g., the client device 110). In some embodiments, the access component 210 on the social messaging system 130 receives the text representation from the client device 110 as part of a message to be transmitted to another client device in communication with the social messaging system 130. In some instances, the access component 210 on the social messaging system 130 receives the text representation as a portion of or all of a notification or request from the client device 110. When received as or in a notification or request, the text representation, or characteristics thereof, may be received in a request for language identification from the client device 110 to the social messaging system 130.

In operation 520, the language component 220 determines one or more languages corresponding to the text representation. The language component 220 determines the one or more languages which correspond to an entirety of the text representation, a portion of the text representation (e.g., a set of characters, one or more words, one or more abbreviations, or one or more sentences.), or combinations thereof. In some embodiments, the language component 220 determines the one or more languages using one or more language detection models generated by the modeling component 240, and described above with respect to FIGS. 3 and 4. The language component 220 may pass the text representation, a portion of the text representation, a set of characters from the text representation, a portion of encoded values from the text representation, or combinations thereof to the one or more language detection models. The language detection models identify a set of languages detected or inferred by the language detection models. In some embodiments, the language detection models pass the set of languages to the language component 220 which selects the one or more languages from the set of languages identified by the language detection models.

In some embodiments, the language component 220 is stored on the social messaging system 130. The language component 220 may receive a request for language identification and the text representation from the client device 110. The social messaging system 130, via the language component 220, may perform analysis of the text representation to identify the one or more languages within the text. In some instances, the language component 220 is stored on the client device 110 such that processing and identification of the one or more languages is performed locally, at the client device 110. Where the language component 220 and the language model are stored on the client device, the language component 220 may analyze the text in real time or near real time as the text is received or as the text is entered at the client device 110.

In some embodiments, a first instance of the language component 220 is stored on the social messaging system 130 and a second instance is stored on the client device 110. The language analysis system 160 may dynamically determine which instance determines the one or more languages. The instance may be dynamically determined based on a characteristic of the text or text representation. The instance may also be selected by processing the text or text representation through the instances in a predefined order and continuing to additional instances based on a confidence value of the determination of each instance.

In operation 530, the application component 230 configures one or more applications for operation using the one or more languages determined by the language component 220. In some embodiments, upon determining the one or more languages, the language component 220 passes an indication or an identifier of the one or more languages to the application component 230. Upon receiving the indication or identifier of the one or more languages, the application component 230 performs one or more operations configuring at least a portion of the one or more applications for operation using the one or more languages.

In some instances, the application component 230 configures a browser to translate information presented in a graphical user interface using at least one of the one or more languages. In some embodiments, the application component 230 configures an application to cluster messages, posts, articles, or other information in the one or more languages. The information clustered by the application may be clustered based on a relevance to the one or more languages, a relevance to a device characteristic associated with the client device 110, a relevance to a user characteristic of the user associated with the client device 110, or any other suitable aspect.

In some instances, the application component 230 configures an application to transmit or present selected messages (e.g., offers, products, services, or information) to a user, or a client device based on the one or more languages. In some embodiments, the application component 230 configures an application to select, present, or retrieve text associated graphical elements based on the one or more languages. The text associated graphical elements may be ideograms, ideographs, or emojis containing text elements (e.g., text written in the at least one language associated with the indication or identifier), or any other suitable text associated graphical elements. The application component 230, upon receiving the indication or identifier for the one or more languages may configure the application, such as a messaging application, to identify or retrieve text associated graphical elements based on text entered into the messaging application. The text included in the text associated graphical elements may be in a language matching the one or more languages. In some embodiments, the application component 230, upon receiving the indication or identifier for the one or more languages may configure the application to translate text incorporated in retrieved text associated graphical elements to match the one or more languages. Although described with respect to specified embodiments, the application component 230 may configure any suitable application to perform operations corresponding to the one or more languages.

Language detection models, trained according to one or more embodiments described herein, achieved 93% precision for identifying non-English documents in the multilingual test dataset. Language detection models determined documents of the test dataset with a France locale label predominantly included text in English and French. Language detection models, validated manually or using one or more automated validation operations, achieved around 99% accuracy in identifying Portuguese language documents. Similarly, languages detection models determined identified languages at an accuracy rate of around 95% for documents having a locale label and two or more languages. Such identification results may be achieved with language detection models trained without access to the labels of the documents and having short character limits. Such identification results may be achieved with language detection models trained without access to the labels of the documents and having short character limits. Example accuracy levels, based on model and feature sets, for example sets of text and example models may be represented in Table 1, below.

| | Macro F-1 | | |
|---|---|---|---|
| Feature Set | Char N-Gram TF-IDF | Word N-Gram TF-IDF | Locale + unicode/ascii Ratio(*) |
| — | 0.96708 | 0.93281 | 0.22921 |
| Char N-Gram TF-IDF+ | — | 0.96854 | 0.96806 |
| Char N-Gram TF-IDF, Word N-Gram TF-IDF+ | — | — | 0.96989 |

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 8:
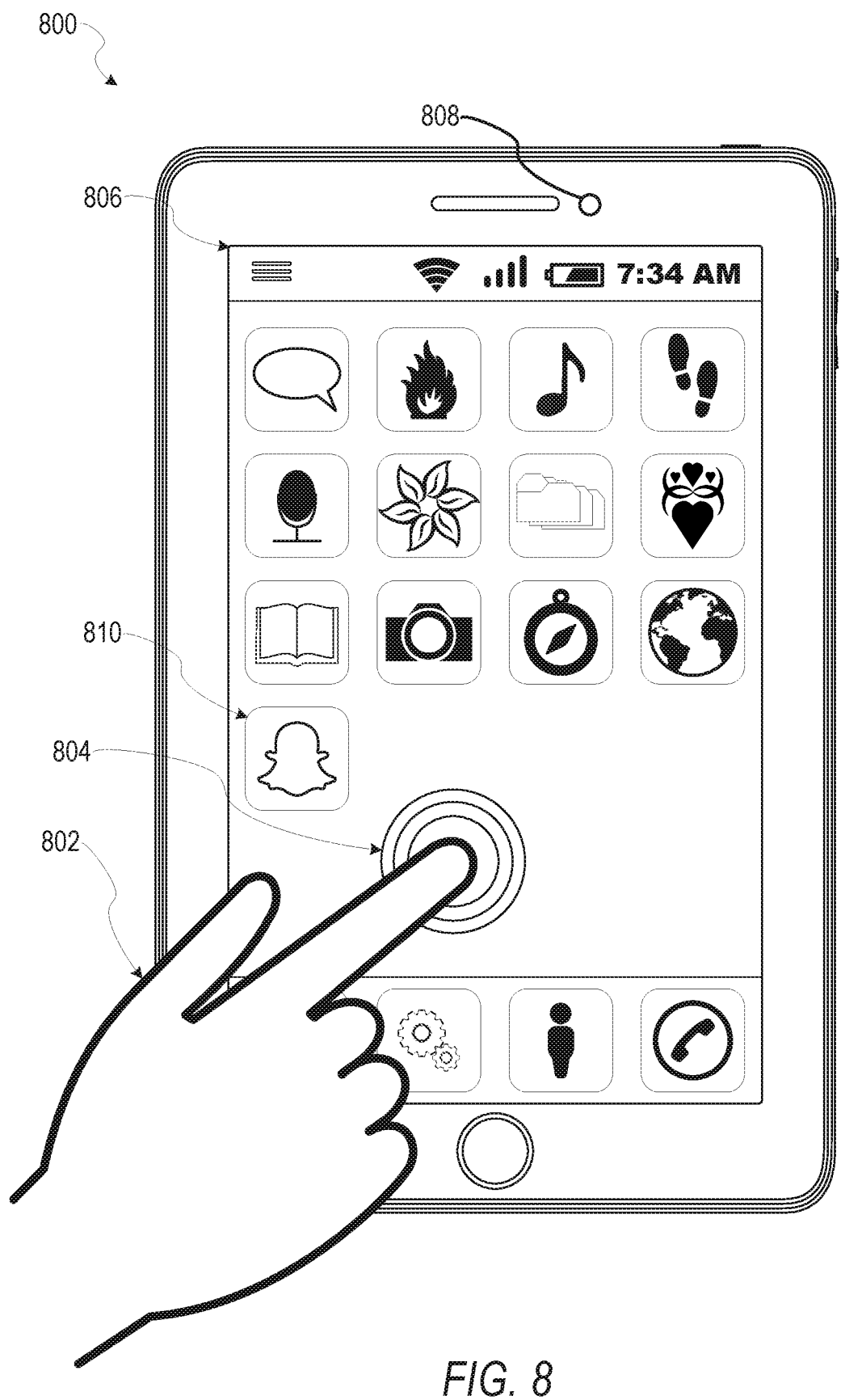
FIG. 8 is a user interface diagram depicting an example mobile device and mobile operating system interface, according to some example embodiments.

FIG. 8 illustrates an example mobile device 800 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device 808 may be a camera or any other device coupled to the mobile device 800 capable of capturing a video stream or one or more successive images. The imaging device 808 may be triggered by the language analysis system 160 or a selectable user interface element to initiate capture of a video stream or succession of images and pass the video stream or succession of images to the language analysis system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the language analysis system 160 may identify one or more languages within the ephemeral message, transmit the ephemeral message to another device using the ephemeral message system, and configure an application associated with the ephemeral message system to operate, present, or cluster information in a manner corresponding to the one or more languages.

Software Architecture

Figure 9:
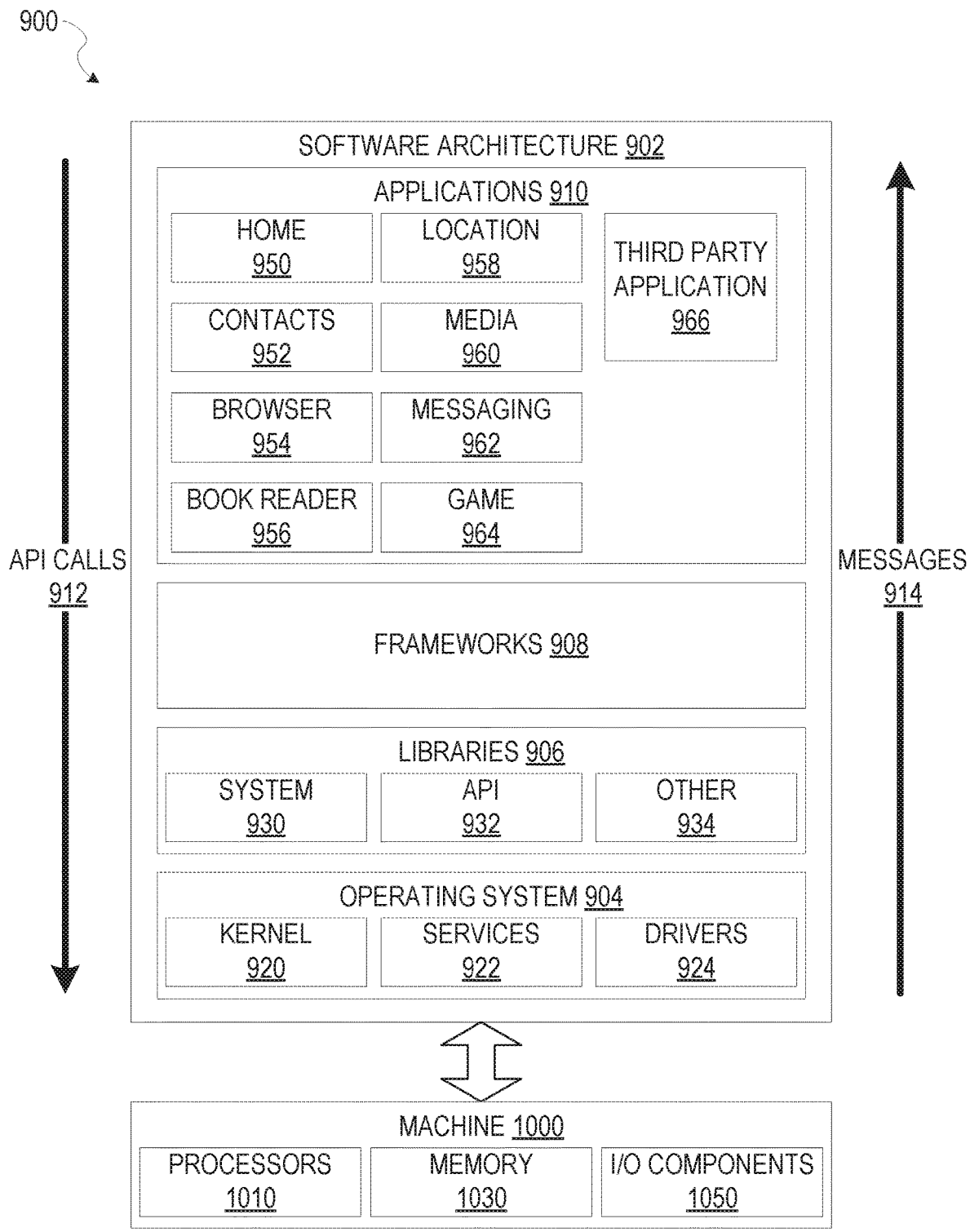
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as machine a 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third-party application 966 can invoke the API calls 912 provided by the operating system 904 to facilitate functionality described herein.

Example Machine Architecture and Machine-Readable Medium

Figure 10:
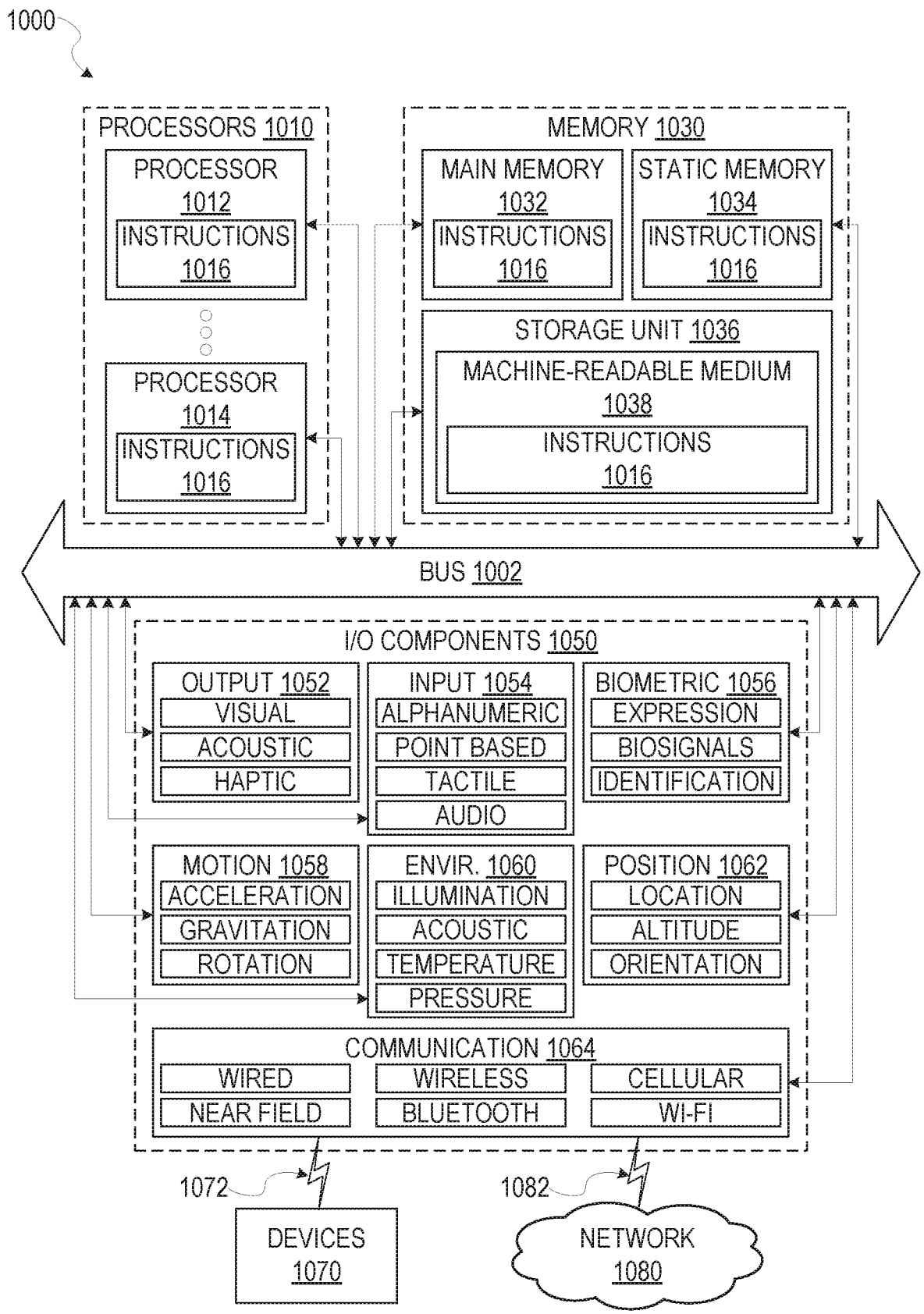
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor executable instructions) from a machine-readable medium (e.g., a non-transitory processor-readable storage medium) and perform any of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

accessing a set of messages comprising text and graphical text elements, the graphical text elements conveying an emotion;

identifying a first subset of messages from the set of messages, the first subset of messages comprising unsuitable messages;

identifying a second subset of messages from the set of messages, the second subset of messages comprising text representing an entity;

identifying a third subset of messages from the set of messages, the third subset of messages comprising superfluous characters;

removing the first subset of messages from the set of messages;

identifying text in the second subset of messages representing a named entity;

removing the identified text from the second subset of messages;

normalizing the superfluous characters within the third subset of messages;

incorporating the second and third subset of messages into a final set of messages;

converting the final set of messages into a set of training messages, the set of training messages configured for training a language detection machine-learning model;

training a classifier based on the set of training messages, the classifier having a set of features comprising a character ratio, wherein the character ratio is based on a number of non-American Standard Code for Information Interchange (ASCII) characters included in a message; and generating a language detection model based on the trained classifier and the set of features.

2. The method of claim 1, further comprising:

identifying a fourth subset of messages having a number of characters below a character threshold; and removing the fourth subset of messages from the set of messages.

3. The method of claim 1, wherein removing the identified text from the second subset of messages further comprises:

for each message, determining a number of characters of the message, in addition to the text representing the named entity, is above a character threshold; and removing the text representing the named entity from the subset of messages.

4. The method of claim 1, wherein identifying the third subset of messages further comprises:

identifying messages having text with repeating characters;

for each message, determining the repeating characters include one or more superfluous characters; and for each message, normalizing the one or more superfluous characters.

5. The method of claim 1, wherein the set of features further comprise term frequency inverse document frequency (TF-IDF) values of words and TF-IDF values of characters.

6. The method of claim 5, wherein the TF-IDF values of characters represents character frequencies for a plurality of character n-grams.

7. The method of claim 5, wherein the TF-IDF values of words represents word frequencies for a plurality of word n-grams.

8. The method of claim 1, wherein the set of features comprises a message locale feature comprising information relating to a location of a user.

9. A system comprising:
one or more processors; and
a non-transitory processor-readable storage medium storing processor executable instructions that, when executed by the one or more processors, cause the one or more processors to perform operations comprising:
accessing a set of messages comprising text and graphical text elements, the graphical text elements conveying an emotion;
identifying a first subset of messages from the set of messages, the first subset of messages comprising unsuitable messages;
identifying a second subset of messages from the set of messages, the second subset of messages comprising text representing an entity;
identifying a third subset of messages from the set of messages, the third subset of messages comprising superfluous characters;
removing the first subset of messages from the set of messages;
identifying text in the second subset of messages representing a named entity;
removing the identified text from the second subset of messages;
normalizing the superfluous characters within the third subset of messages;
incorporating the second and third subset of messages into a final set of messages;
converting the final set of messages into a set of training messages, the set of training messages configured for training a language detection machine-learning model;
training a classifier based on the set of training messages, the classifier having a set of features comprising a character ratio, wherein the character ratio is based on a number of non-American Standard Code for Information Interchange (ASCII) characters included in a message; and
generating a language detection model based on the trained classifier and the set of features.

10. The system of claim 9, further comprising:
identifying a fourth subset of messages having a number of characters below a character threshold; and
removing the fourth subset of messages from the set of messages.

11. The system of claim 9, wherein removing the identified text from the second subset of messages further comprises:
for each message, determining a number of characters of the message, in addition to the text representing the named entity, is above a character threshold; and
removing the text representing the named entity from the subset of messages.

12. The system of claim 9, wherein identifying the third subset of messages further comprises:
identifying messages having text with repeating characters;
for each message, determining the repeating characters include one or more superfluous characters; and
for each message, normalizing the one or more superfluous characters.

13. The system of claim 9, wherein the set of features further comprise term frequency inverse document frequency (TF-IDF) values of words and TF-IDF values of characters.

14. The system of claim 13, wherein the character ratio represents a number of characters, excluded from a known character set, relative to a length of a message.

15. A non-transitory processor-readable storage medium storing processor executable instructions that, when executed by a processor of a machine, cause the machine to perform operations comprising:
accessing a set of messages comprising text and graphical text elements, the graphical text elements conveying an emotion;
identifying a first subset of messages from the set of messages, the first subset of messages comprising unsuitable messages;
identifying a second subset of messages from the set of messages, the second subset of messages comprising text representing an entity;
identifying a third subset of messages from the set of messages, the third subset of messages comprising superfluous characters;
removing the first subset of messages from the set of messages;
identifying text in the second subset of messages representing a named entity;
removing the identified text from the second subset of messages;
normalizing the superfluous characters within the third subset of messages;
incorporating the second and third subset of messages into a final set of messages;
converting the final set of messages into a set of training messages, the set of training messages configured for training a language detection machine-learning model;
training a classifier based on the set of training messages, the classifier having a set of features comprising a character ratio, wherein the character ratio is based on a number of non-American Standard Code for Information Interchange (ASCII) characters included in a message; and
generating a language detection model based on the trained classifier and the set of features.

16. The non-transitory processor-readable storage medium of claim 15, further comprising:
identifying a fourth subset of messages having a number of characters below a character threshold; and
removing the fourth subset of messages from the set of messages.

17. The non-transitory processor-readable storage medium of claim 15, wherein removing the identified text from the second subset of messages further comprises:
for each message, determining a number of characters of the message, in addition to the text representing the named entity, is above a character threshold; and
removing the text representing the named entity from the subset of messages.

18. The non-transitory processor-readable storage medium of claim 15, wherein identifying the third subset of messages further comprises:
identifying messages having text with repeating characters;
for each message, determining the repeating characters include one or more superfluous characters; and
for each message, normalizing the one or more superfluous characters.

19. The non-transitory processor-readable storage medium of claim 15, wherein the set of features further comprise term frequency inverse document frequency (TF-IDF) values of words and TF-IDF values of characters.

20. The non-transitory processor-readable storage medium of claim 19, wherein the TF-IDF values of words represents word frequencies for a plurality of word n-grams.

\* \* \* \* \*